US007508818B2

(12) United States Patent
Monai

(10) Patent No.: US 7,508,818 B2
(45) Date of Patent: Mar. 24, 2009

(54) IP TELEPHONY METHOD AND IP TELEPHONE SYSTEM

(75) Inventor: Nobuhiro Monai, Kawasaki (JP)

(73) Assignee: NEC Infrontia Corporation, Kawasaki-Shi (JP)

( * ) Notice: Subject to any disclaimer, the term of this patent is extended or adjusted under 35 U.S.C. 154(b) by 592 days.

(21) Appl. No.: 11/078,341

(22) Filed: Mar. 14, 2005

(65) Prior Publication Data

US 2005/0207431 A1     Sep. 22, 2005

(30) Foreign Application Priority Data

Mar. 16, 2004   (JP)   ............................. 2004-074598

(51) Int. Cl.
*H04L 12/66* (2006.01)
*H04L 12/28* (2006.01)
(52) U.S. Cl. ...................................... 370/352; 370/389
(58) Field of Classification Search ........................ None
See application file for complete search history.

(56) References Cited

U.S. PATENT DOCUMENTS

| | | | |
|---|---|---|---|
| 6,822,955 B1 * | 11/2004 | Brothers et al. | 370/389 |
| 2002/0085561 A1 * | 7/2002 | Choi et al. | 370/392 |
| 2003/0033418 A1 * | 2/2003 | Young et al. | 709/230 |
| 2004/0194106 A1 * | 9/2004 | Ogawa | 718/100 |
| 2005/0135391 A1 * | 6/2005 | Sung | 370/401 |
| 2006/0155864 A1 * | 7/2006 | Izumi | 709/230 |

FOREIGN PATENT DOCUMENTS

| | | |
|---|---|---|
| JP | 11-205475 | 7/1999 |
| JP | 2000-059415 | 2/2000 |
| JP | 2000-244641 | 9/2000 |
| JP | 2000-286882 | 10/2000 |
| JP | 2002-033743 | 1/2002 |
| JP | 2002-176432 | 6/2002 |
| JP | 2003-344531 | 11/2002 |
| JP | 2003-046665 | 2/2003 |
| JP | 2003-507967 | 2/2003 |
| JP | 2003-256223 | 9/2003 |
| JP | 2003-264638 | 9/2003 |
| JP | 2003-273900 | 9/2003 |

OTHER PUBLICATIONS

Masataka Kado et al, Mobile Voice Communications On The Existing Internet Technologies- NAT & Firewall Traversal in Mobile Voice Communications, 2003, pp. 1-7.

* cited by examiner

*Primary Examiner*—Wing F Chan
*Assistant Examiner*—Eunsook Choi
(74) *Attorney, Agent, or Firm*—Young & Thompson

(57) ABSTRACT

An IP telephony method facilitating transferring an IP telephony communication inside a LAN is realized. A telephone conversation takes place between a first IP telephone terminal and a conversation partner's IP telephone terminal through a router and a proxy. The proxy relays the telephone conversation by referring to a proxy table that holds a correspondence among a global IP address and a receive port of the conversation partner's IP telephone terminal, and a local IP address and a receive port of the first IP telephone terminal during relay. To perform transfer from the first IP telephone terminal to a second IP telephone terminal, the local IP address and the receive port of the first IP telephone terminal in the proxy table are changed to a local IP address and a receive port of the second IP telephone terminal, respectively.

36 Claims, 10 Drawing Sheets

FIG.2

102: NAT TABLE

| GLOBAL IP ADDRESS OF ROUTER | LOCAL IP ADDRESS OF PROXY |
|---|---|
| 10.11.12.13 | 192.168.0.2 |
|  |  |

FIG.3

104: PROXY TABLE

| GLOBAL IP ADDRESS OF CONVERSATION PARTNER'S IP TELEPHONE TERMINAL | RECEIVE PORT NUMBER OF CONVERSATION PARTNER'S | LOCAL IP ADDRESS OF IP TELEPHONE TERMINAL INSIDE LAN | RECEIVE PORT NUMBER OF IP TELEPHONE TERMINAL INSIDE LAN |
|---|---|---|---|
| 20.21.22.23 | 7001 | 192.168.0.11 | 6001 |
|  |  |  |  |

FIG.4

106: CALL CONTROL SERVER TABLE

| TELEPHONE No. | LOCAL IP ADDRESS |
|---|---|
| #101 | 192.168.0.11 |
| #102 | 192.168.0.12 |
| ⋮ | |
| #110 | 192.168.0.20 |
| #201 | 192.168.0.2 |
| #202 | 192.168.0.2 |
| ⋮ | |
| #210 | 192.168.0.2 |

IP TELEPHONE TERMINALS INSIDE LAN: #101–#110

IP TELEPHONE TERMINALS OUTSIDE LAN: #201–#210

LOCAL IP ADDRESS OF RTP GATEWAY

FIG.5

109: DNS TABLE

| #201 | 20.21.22.23 |
|---|---|
| #202 | 30.31.32.33 |
| ⋮ | |
| #210 | 90.91.92.93 |

FIG.12

| 20.21.22.23 | 7001 | 30.31.32.33 | 8001 |
|---|---|---|---|

IP TELEPHONY METHOD AND IP TELEPHONE SYSTEM

BACKGROUND OF THE INVENTION

1. Field of the Invention

The present invention relates to an Internet Protocol (IP) telephony method for causing a telephone conversation to take place between two IP telephone terminals through a proxy and a router using an IP packet that includes a voice packet, and a system thereof.

2. Description of the Related Art

Following the development of Internet-related technologies, the IP telephony using the Internet has become popular. This IP telephony establishes a voice conversation according to a protocol such as real-time transport protocol (RTP) when a communication line has been established by performing signaling according to a protocol such as session initiation protocol (SIP) or H. 323.

Prior art literatures related to the present invention are as follows: JPA-H11-205475, JPA-2000-286882 and JPA-2003-46665.

The currently popular IP telephony is premised on the fact that one IP telephone terminal is connected to one router disposed in a company or an ordinary household.

Namely, when an IP telephony call arrives, the router establishes a correspondence between a pair of a global IP address and a global port number, and a pair of a local IP address and a local port number using a network address translation (NAT) technique or an IP masquerade technique. The correspondence is kept while an IP telephony communication takes place.

A plurality of IP telephone terminals are connected to a local area network (LAN) to which the router belongs. At present, however, there has been proposed no method for transferring the IP telephone communication from one IP telephone terminal to another IP telephone terminal.

SUMMARY OF THE INVENTION

It is, therefore, an object of the present invention to realize an IP telephony method capable of facilitating transferring an IP telephony communication inside a LAN, and a system thereof.

According to a first aspect of the present invention, there is provided an IP telephony method for causing a telephone conversation to take place between a caller's IP telephone terminal and a conversation partner's IP telephone terminal through a proxy and a router using an IP packet including a voice packet, the method comprising: a first record generation step of generating a first record that represents a correspondence between a local IP address of a caller's first IP telephone terminal and a global IP address of the conversation partner's IP telephone terminal; a step of causing the proxy to receive the IP packet transmitted from the caller' first IP telephone terminal; a step of causing the proxy to change a destination IP address of the IP packet to the global IP address of the conversation partner's IP telephone terminal by referring to the local IP address of the caller's first IP telephone terminal and the first record; a first transfer step of causing the proxy to transfer the IP packet, the destination address of which is changed, to the router; and a second transfer step of causing the router to transfer the IP packet, which is received from the proxy, to the conversation partner's IP telephone terminal.

The IP telephony method according to the first aspect may further comprise: a step of generating a second record that represents a correspondence between a global IP address of the router and a local IP address of the proxy; and a step of causing the router to change a sender IP address of the IP packet, which is received from the proxy, to the global IP address of the router before the second transfer step by referring to the local IP address of the proxy and the second record.

The IP telephony method according to the first aspect may further comprise, before the first record generation step: a step of preparing a first table that holds a correspondence between a telephone number of an IP telephone terminal outside a LAN and a global IP address of the IP telephone terminal outside the LAN; an outgoing message reception step of causing the proxy to receive an outgoing message in which a telephone number of the conversation partner's IP telephone terminal and the local IP address of the caller's first IP telephone terminal are described; and a step of causing the proxy to acquire the global IP address of the conversation partner's IP telephone terminal corresponding to the telephone number described in the outgoing message which is received, from the table, wherein at the first record generation step, the first record may be generated using the local IP address of the caller's first IP telephone terminal received by the proxy and the global IP address of the conversation partner's IP telephone terminal acquired by the proxy.

The IP telephony method according to the first aspect may further comprise, before the outgoing message reception step: a step of preparing a second table that holds a correspondence between the telephone number of the IP telephone terminal outside the LAN and a local IP address of the proxy; a step of causing the caller's first IP telephone terminal to transmit the outgoing message, in which the telephone number of the conversation partner's IP telephone terminal is described, to a call control server; a step of causing the call control server to search the local IP address of the proxy corresponding to the telephone number described in the outgoing message received from the caller's first IP telephone terminal, from the second table; and an outgoing message transfer step of causing the call control server to transfer the outgoing message to the proxy while setting the local IP address of the proxy searched from the second table as the destination IP address of the IP packet, wherein the outgoing message reception step may be executed to correspond to the outgoing message transfer step.

The IP telephony method according to the first aspect may further comprise: a first record rewrite step of rewriting the local IP address of the caller's first IP telephone terminal in the first record to a local IP address of a caller's second IP telephone terminal; a step of causing the proxy to receive the IP packet transmitted from the caller's second IP telephone terminal; a step of causing the proxy to change the destination IP address of the IP packet to the global IP address of the conversation partner's IP telephone terminal by referring to the local IP address of the caller's second IP telephone terminal and the first record in which the local IP address of the caller's first IP telephone terminal is rewritten to the local IP address of the caller's second IP telephone terminal; a third transfer step of causing the proxy to transfer the IP packet, the destination address of which is changed, to the router; and a fourth transfer step of causing the router to transfer the IP packet, which is received from the proxy, to the conversation partner's IP telephone terminal.

The IP telephony method according to the first aspect may further comprise, before the first record rewrite step: a transfer indication message transmission step of causing a call control server to transmit a transfer indication message accompanied by the local IP address of the caller's first IP telephone terminal and the local IP address of the caller's second IP telephone terminal, to the proxy, wherein the first record rewrite step is executed based on the local IP address of the caller's first IP telephone terminal and the local IP address of the caller's second IP telephone terminal transmitted at the transfer indication message transmission step.

The IP telephony method according to the first aspect may further comprise, before the transfer indication message transmission step: a caller's first IP telephone terminal local IP address detection step of detecting the local IP address of the caller's first IP telephone terminal; and a caller's second IP telephone terminal local IP address detection step of detecting the local IP address of the caller's second IP telephone terminal.

The IP telephony method according to the first aspect may further comprise, before the caller's first IP telephone terminal local IP address detection step: a step of preparing a third table that represents a correspondence between a telephone number of the each caller's IP telephone terminal and the local IP address of the each caller's IP telephone terminal; and a step of detecting the telephone number of the caller's first IP telephone terminal, wherein the caller's first IP telephone terminal local IP address detection step may be executed based on the detected telephone number of the caller's first IP telephone terminal and the third table.

The IP telephony method according to the first aspect may further comprise, before the caller's second IP telephone terminal local IP address detection step: a step of preparing a third table that represents a correspondence between a telephone number of the each caller's IP telephone terminal and the local IP address of the each caller's IP telephone terminal; and a step of detecting the telephone number of the caller's second IP telephone terminal, wherein the caller's second IP telephone terminal local IP address detection step is executed based on the detected telephone number of the caller's, second IP telephone terminal and the third table.

According to a second aspect of the present invention, there is provided an IP telephony method for causing a telephone conversation to take place between a caller's IP telephone terminal and a conversation partner's IP telephone terminal through a proxy and a router using an IP packet including a voice packet, the method comprising: a first record generation step of generating a first record that represents a correspondence among a local IP address of a caller's first IP telephone terminal, a receive port of the caller's first IP telephone terminal, a global IP address of the conversation partner's IP telephone terminal, and a receive port of the conversation partner's IP telephone terminal; a first transfer step of causing the router to transfer the IP packet, which is transmitted from the conversation partner's IP telephone terminal, to the proxy; a step of causing the proxy to change a destination IP address of the IP packet to the local IP address of the caller's first IP telephone terminal by referring to a port number of the IP packet received from the router and the first record; and a second transfer step of causing the proxy to transfer the IP packet, the destination IP address of which is changed, to the caller's first IP telephone terminal.

The IP telephony method according to the second aspect may further comprise: a step of generating a second record that represents a correspondence between a global IP address of the router and a local IP address of the proxy; and a step of causing the router to change a destination IP address of the IP packet, which is received from the conversation partner's IP telephone terminal, to the local IP address of the proxy before the first transfer step by referring to the global IP address of the router and the second record.

The IP telephony method according to the second aspect may further comprise, before the first record generation step: a step of preparing a first table that holds a correspondence between a telephone number of an IP telephone terminal outside a LAN and a global IP address of the IP telephone terminal outside the LAN; an outgoing message reception step of causing the proxy to receive an outgoing message in which a telephone number of the conversation partner's IP telephone terminal and the local IP address of the caller's first IP telephone terminal are described; and a step of causing the proxy to acquire the global IP address of the conversation partner's IP telephone terminal corresponding to the telephone number described in the outgoing message which is received, from the table, wherein at the first record generation step, the first record is generated using the local IP address of the caller's first IP telephone terminal received by the proxy and the global IP address of the conversation partner's IP telephone terminal acquired by the proxy.

The IP telephony method according to the second aspect may further comprise, before the outgoing message reception step: a step of preparing a second table that holds a correspondence between the telephone number of the IP telephone terminal outside the LAN and a local IP address of the proxy; a step of causing the caller's first IP telephone terminal to transmit the outgoing message, in which the telephone number of the conversation partner's IP telephone terminal is described, to a call control server; a step of causing the call control server to search the local IP address of the proxy corresponding to the telephone number described in the outgoing message received from the caller's first IP telephone terminal, from the second table; and an outgoing message transfer step of causing the call control server to transfer the outgoing message to the proxy while setting the local IP address of the proxy searched from the second table as the destination IP address of the IP packet, wherein the outgoing message reception step is executed to correspond to the outgoing message transfer step.

The IP telephony method according to the second aspect may further comprise: a first record rewrite step of rewriting the local IP address of the caller's first IP telephone terminal in the first record to a local IP address of a caller's second IP telephone terminal; the first transfer step of causing the router to transfer the IP packet, which is transmitted from the conversation partner's IP telephone terminal, to the proxy; a step of causing the proxy to change the destination IP address of the IP packet, which is received from the router, to the local IP address of the caller's second IP telephone terminal by referring to a port number of the IP packet received from the router and the first record; and the second transfer step of causing the proxy to transfer the IP packet, the destination IP address of which is changed, to the caller's second IP telephone terminal.

The IP telephony method according to the second aspect may further comprise, before the first record rewrite step: a transfer indication message transmission step of causing a call control server to transmit a transfer indication message accompanied by the local IP address of the caller's first IP telephone terminal and the local IP address of the caller's second IP telephone terminal, to the proxy, wherein the first record rewrite step may be executed based on the local IP address of the caller's first IP telephone terminal and the local IP address of the caller's second IP telephone terminal transmitted at the transfer indication message transmission step.

The IP telephony method according to the second aspect may further comprise, before the transfer indication message transmission step: a caller's first IP telephone terminal local IP address detection step of detecting the local IP address of the caller's first IP telephone terminal; and a caller's second IP telephone terminal local IP address detection step of detecting the local IP address of the caller's second IP telephone terminal.

The IP telephony method according to the second aspect may further comprise, before the caller's first IP telephone terminal local IP address detection step: a step of preparing a third table that represents a correspondence between a telephone number of the each caller's IP telephone terminal and the local IP address of the each caller's IP telephone terminal; and a step of detecting the telephone number of the caller's first IP telephone terminal, wherein the caller's first IP telephone terminal local IP address detection step is executed based on the detected telephone number of the caller's first IP telephone terminal and the third table.

The IP telephony method according to the second aspect may further comprise, before the caller's second IP telephone terminal local IP address detection step: a step of preparing a third table that represents a correspondence between a telephone number of the each caller's IP telephone terminal and the local IP address of the each caller's IP telephone terminal; and a step of detecting the telephone number of the caller's second IP telephone terminal, wherein the caller's second IP telephone terminal local IP address detection step may be executed based on the detected telephone number of the caller's second IP telephone terminal and the third table.

According to a third aspect of the present invention, there is provided an IP telephony method for causing a telephone conversation to take place between a first IP telephone terminal outside a LAN and a second IP telephone terminal outside the LAN through a proxy and a router using an IP packet including a voice packet, the method comprising: a first record generation step of generating a first record that represents a correspondence among a global IP address of the first IP telephone terminal outside the LAN, a receive port of the first IP telephone terminal outside the LAN, a global IP address of the second IP telephone terminal outside the LAN, and a receive port of the second IP telephone terminal outside the LAN; a first transfer step of causing the router to transfer the IP packet, which is transmitted from the first IP telephone terminal outside the LAN, to the proxy; a step of causing the proxy to change a destination IP address of the IP packet to the global IP address of the second IP telephone terminal outside the LAN by referring to a port number of the IP packet received from the router and the first record; the first transfer step of causing the proxy to transfer the IP packet, the destination IP address of which is changed, to the router; and a second transfer step of causing the router to transfer the IP packet, which is received from the proxy, to the second IP telephone terminal outside the LAN.

BRIEF DESCRIPTION OF THE DRAWINGS

FIG. 2 depicts a configuration of a NAT table shown in FIG. 1;

FIG. 3 depicts a configuration of a proxy table shown in FIG. 1;

FIG. 4 depicts a configuration of a call control server table shown in FIG. 1;

FIG. 5 depicts a configuration of a DNS table shown in FIG. 1;

FIG. 12 depicts an example of record data held in a proxy table shown in FIG. 1 and employed when a telephone conversation between IP telephone terminals outside a LAN is relayed.

DESCRIPTION OF THE PREFERRED EMBODIMENT

A most preferred embodiment of the present invention will be described hereinafter in detail with reference to the drawings.

1. Configuration

Figure 1:
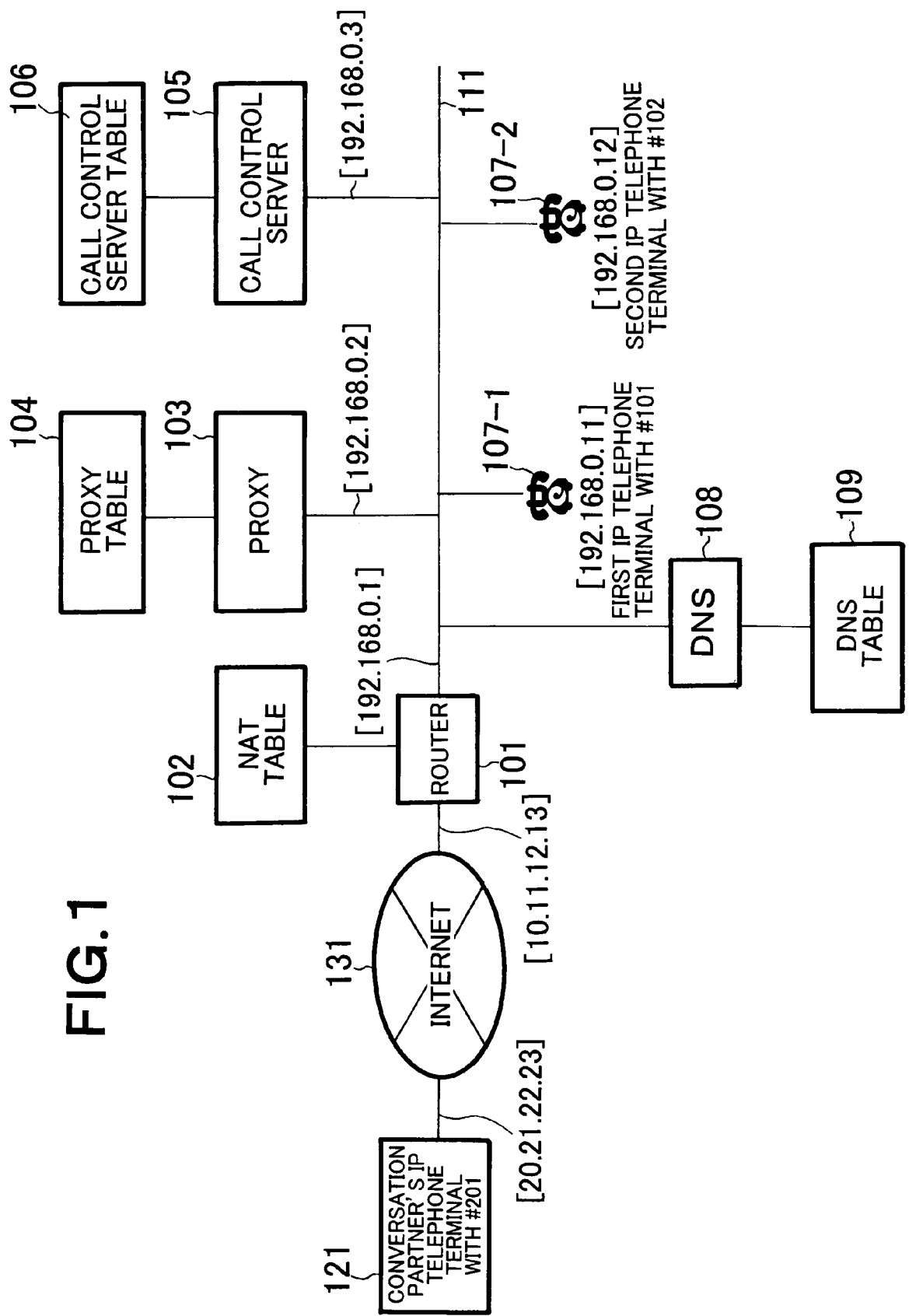
FIG. 1 is a block diagram that depicts a configuration and the like of an IP telephony system according to one embodiment of the present invention.

FIG. 1 depicts a configuration of an IP telephony system according to one embodiment of the present invention.

Referring to FIG. 1, the IP telephony system according to the embodiment of the present invention includes a router 101, a NAT table 102, a proxy 103, a proxy table 104, a call control server 105, a call control server table 106, a first IP telephone terminal 107-1, a second IP telephone terminal 107-2, a domain name server (DNS) 108, a DNS table 109, and a LAN 111. The IP telephony system may include other IP telephone terminals, not shown.

The router 101, the proxy 103, the call control server 105, the first IP telephone terminal 107-1, the second IP telephone terminal 107-2, and the DNS 108 are mutually connected through the LAN 111. As shown in FIG. 1, local IP addresses allocated to the router 101, the proxy 103, the call control server 105, the first IP telephone terminal 107-1, and the second IP telephone terminal 107-2, respectively inside the LAN 111 are, for example, as follows:

| | |
|---|---|
| Router 101 | 192.168.0.1 |
| Proxy 103 | 192.168.0.2 |
| Call control server 105 | 192.168.0.3 |
| First IP telephone terminal 107-1 | 192.168.0.11 |
| Second IP telephone terminal 107-2 | 192.168.0.12 |

The router 101 is connected to a conversation partner's IP telephone terminal 121 through the Internet 131. The conversation partner's IP telephone terminal 121 is either an independent IP telephone terminal or an IP telephone terminal in a similar IP telephony system to the caller's IP telephony system.

As shown in FIG. 1, global IP addresses allocated to the router 101 and the conversation partner's IP telephone terminal 121 on the Internet 131 are, for example, as follows:

| | |
|---|---|
| Router 101 | 10.11.12.13 |
| Conversation partner's IP telephone terminal 121 | 20.21.22.23 |

The NAT table 102 is connected to the router 101, the proxy table 104 is connected to the proxy 103, the call control server table 106 is connected to the call control server 105, and the DNS table 109 is connected to the DNS 108.

As shown in FIG. 2, the NAT table 102 holds a correspondence between the global IP address of the router 101 and the local IP address of the proxy 103 since the system is constructed.

As shown in FIG. 3, the proxy table 104 includes a record per telephone conversation whenever the telephone conversation is established. Each record holds a correspondence among the global IP address of the conversation partner's IP telephone terminal, a receive port number of the conversation partner's IP telephone terminal, the local IP address of each IP telephone terminal inside the LAN, and a receive port number of each IP telephone terminal inside the LAN. Each record is generated during signaling and deleted when the corresponding telephone conversation is finished.

As shown in FIG. 4, the call control server table 106 holds a correspondence between a telephone number and a local IP address for each IP telephone terminal since the system is constructed. In the example of FIG. 4, telephone numbers #101, #102, ..., and #110 are extension numbers of respective IP telephone terminals inside the LAN, and telephone numbers #201, #202, ..., and #201 are telephone numbers of respective IP telephone terminals outside the LAN. A local IP address corresponding to the extension number of each IP telephone terminal inside the LAN is the local IP address of the IP telephone terminal. A local IP address corresponding to the telephone number of each IP telephone terminal outside the LAN is the local IP address of the proxy 103.

As shown in FIG. 5, the DNS table 109 holds a correspondence between the telephone number of each telephone outside the LAN and the global IP address thereof since the system is constructed.

2. Operation

An IP telephony communication method executed by the IP telephony system shown in FIG. 1 will be described.

2-1. Signaling

Figure 6:
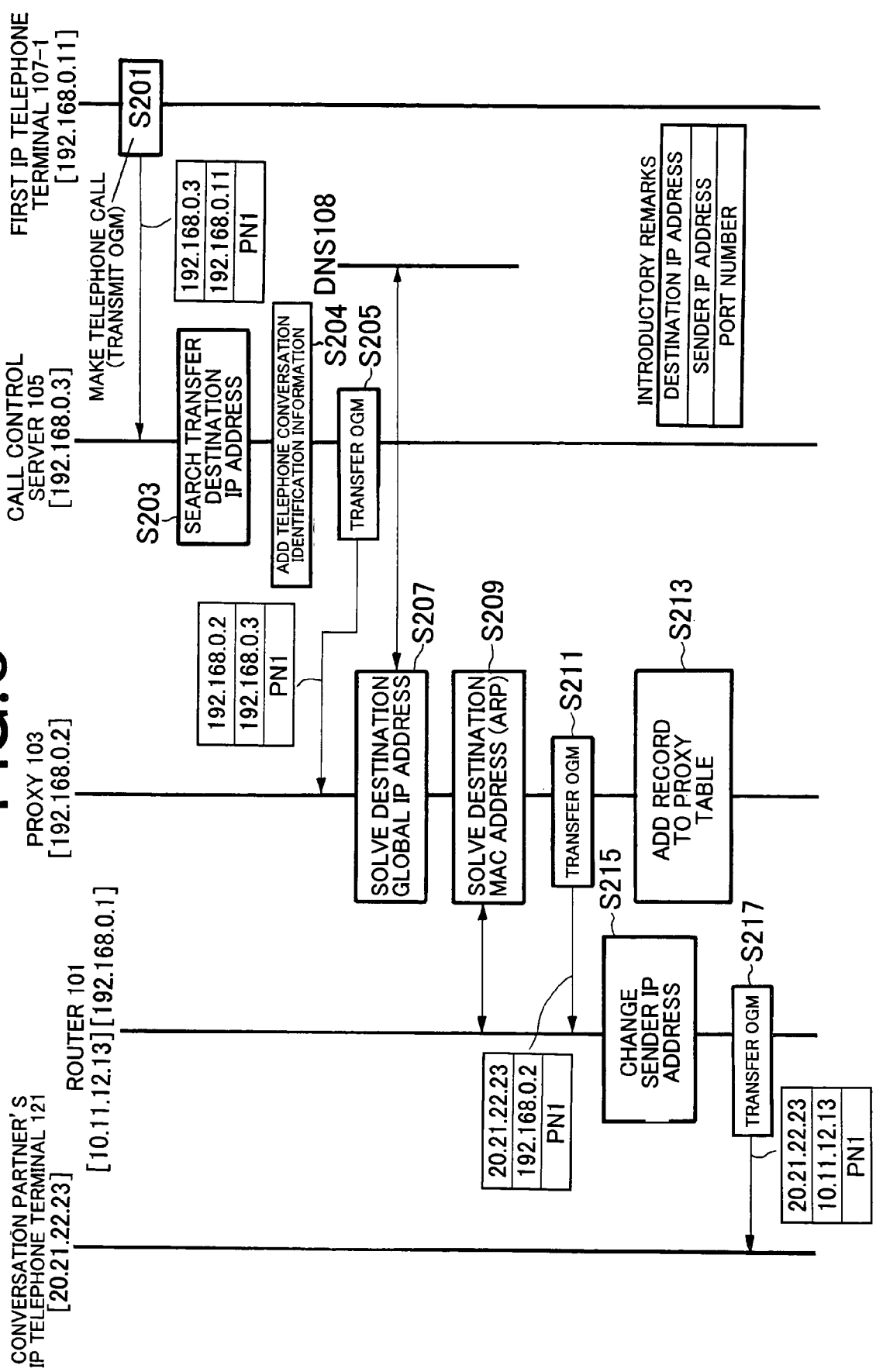
FIG. 6 is a first sequence chart that depicts an operation performed by an IP telephony system during signaling according to the embodiment of the present invention.

Referring to FIG. 6, if the first IP telephone terminal 107-1 is to make a telephone call to the conversation partner's IP telephone terminal 121 having the telephone number #201 outside the LAN 111, the first IP telephone terminal 107-1 transmits an outgoing message (hereinafter, "OGM") having caller's desired communication conditions described on a layer equal to or higher than a fifth layer of an Open Systems Interconnection (OSI) reference model (which layer will be referred to simply as "higher layer" hereinafter) to the call control server 105 (at a step S201). The caller's desired communication conditions include the telephone number #201 of the conversation partner's IP telephone terminal 121, information for identifying a protocol which the first IP telephone terminal 107-1 is to use, the local IP address of the first IP telephone terminal 107-1, a receive port number that is desired by the first IP telephone terminal 107-1 and that is one for the first IP telephone terminal 107-1, and the like. The information for identifying the protocol which the first IP telephone terminal 107-1 is to use is, for example, information for identifying the RTP. A sender IP address of an IP packet that carries the OGM is the local IP address (192.168.0.11) of the first IP telephone terminal 107-1, a destination IP address thereof is the local IP address (192.168.0.3) of the call control server 105, and a port number thereof is a reserved port number (PN1) for signaling.

The call control server 105 searches the local IP address inside the LAN 111 (which is not the local IP address of the conversation partner's IP telephone terminal 121) corresponding to the telephone number #201 of the second IP telephone terminal 107-2 included in the OGM received from the first IP telephone terminal 107-1, from the call control server table 106 (at a step S203). The searched local IP address is the local IP address (192.168.0.2) of the proxy 103. To put through a call to the second IP telephone terminal 107-2 inside the LAN 111, for example, the call control server 105 searches the local IP address (192.168.0.12) of the second IP telephone terminal 107-2 from the call control server table 106.

The call control server 105 adds telephone conversation identification information to the caller's desired communication conditions. This telephone conversation identification information can prevent lines from being crossed.

The call control server 105 transfers the OGM to the proxy 103 to which the local IP address searched at the step S203 is allocated (at a step S205). The sender IP address of the IP packet that carries the transferred OGM is the local IP address (192.168.0.3) of the call control server 105, and the destination address thereof is the local IP address (192.168.0.2) of the proxy 103. To put through a call to the second IP telephone terminal 170-2 inside the LAN 111, for example, the call control server 105 transfers the OGM to the second IP telephone terminal 107-2, followed by signaling for starting an ordinary telephone conversion inside the LAN 111.

The proxy 103 inquires the DNS 108 about the global IP address corresponding to the telephone number #201 of the conversation partner's IP telephone terminal 121 which is described on a higher layer of the OGM received at the step S205. The DNS 108 searches the global IP address corresponding to the telephone number #201 of the conversation partner's telephone terminal 121 from the DNS table 109, and notifies the proxy 103 of the searched global IP address (at a step S207). The DNS table 109 may be connected to one of the proxy 103 and the call control server 105.

The proxy 103 broadcasts an address resolution protocol (ARP) request packet so as to know a media access control (MAC) address corresponding to the global IP address notified at the step S207. In response to the ARP request packet, the router 101 serving as a default gateway transmits an ARP response packet for notifying the proxy 103 of a MAC address of the router 101 to the proxy 103 (at a step S209).

The proxy 103 transfers the OGM to the router 101 (at a step S211). A sender MAC address of this OGM is a MAC address of the proxy 103, and the destination MAC address thereof is the MAC address of the router 101. In addition, the sender IP address of the OGM is the local IP address of the proxy 103, and the destination IP address thereof is the global IP address of the conversation partner's IP telephone terminal 121.

The proxy 103 adds a new record to the proxy table 104, and writes the global IP address (20.21.22.23) of the conversation partner's IP telephone terminal 121 that is a recipient and the local IP address (192.168.0.11) of the IP telephone terminal that is a caller (at a step S213). The global IP address of the conversation partner's IP telephone terminal 121 has been searched at the step S207, and the local IP address of the IP telephone terminal is read from the higher layer of the OGM.

The router 101 rewrites the sender IP address of the OGM received at the step S211 from the local IP address of the proxy 103 to the global IP address of the router 101 (at a step S215), and transfers the OGM to the conversation partner's IP telephone terminal 121 (at a step S217).

Figure 7:
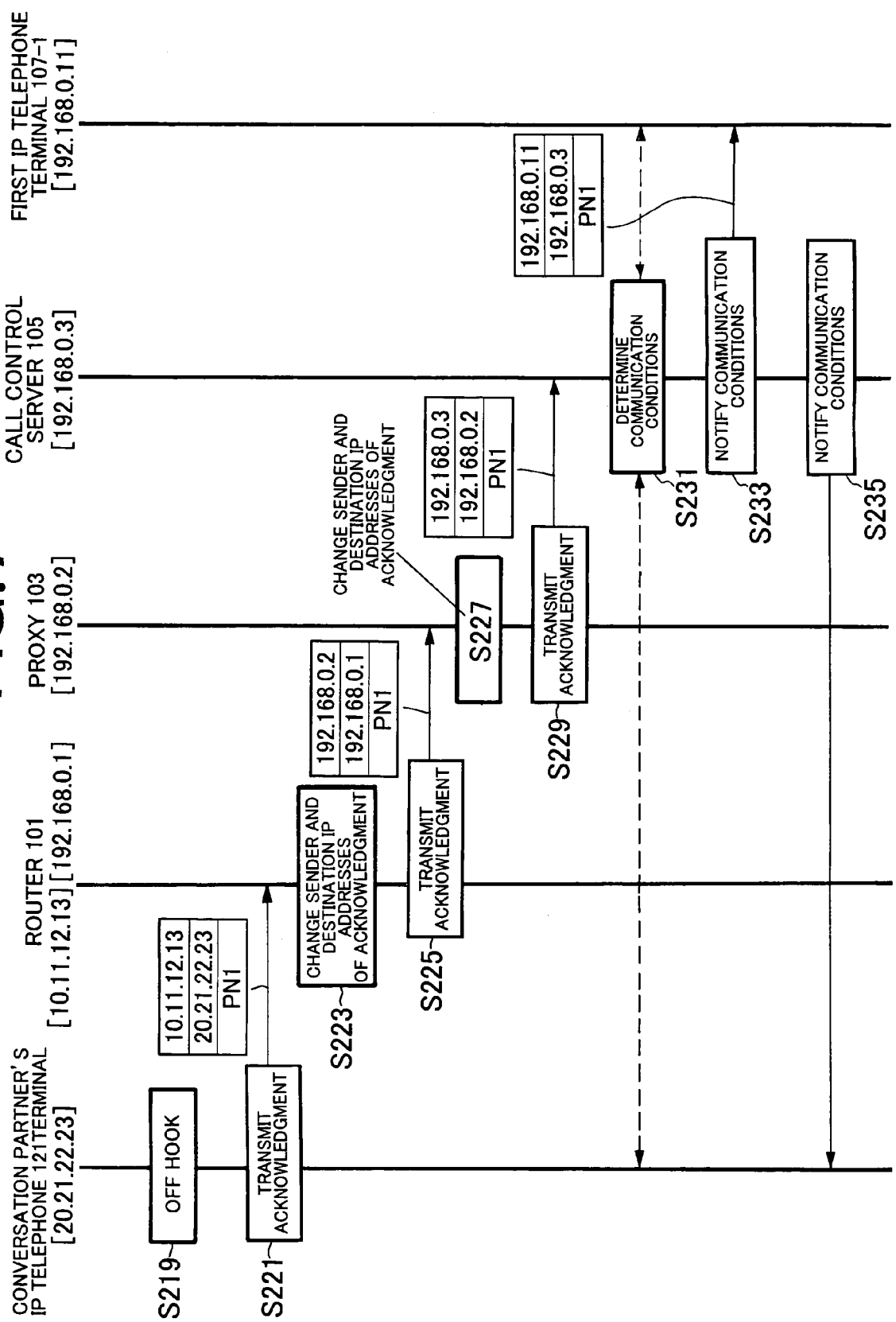
FIG. 7 is a second sequence chart that depicts the operation performed by the IP telephony system during signaling according to the embodiment of the present invention.

Referring to FIG. 7, if the second IP telephone terminal 107-2 is let off the hook and the conversation partner's IP telephone terminal 121 determines to establish a telephone conversation under communication conditions desired by the first IP telephone terminal 107-1 or modified communication conditions thereof (at a step S219), the conversation partner's IP telephone terminal 121 transmits an acknowledgment (hereinafter, "ACK") message to the router 101 (at a step S221). A sender IP address of the ACK message is the global IP address (20.21.22.23) of the conversation partner's IP telephone terminal 121, a destination IP address thereof is the global IP address (10.11.12.13) of the router 101, and a port number thereof is the reserved port number (PN1) for signaling. The ACK message includes recipient's desired communication conditions. The recipient's desired communication conditions include the same conversation identification information as that included in the caller's desired communication conditions, information for identifying a protocol which the conversation partner's IP telephone terminal 121 desires to use, the telephone number of the conversation partner's IP telephone terminal 121, the global IP address of the conversation partner's IP telephone terminal 121, a receive port number that is desired by the conversation partner's IP telephone terminal 121 and that is one for the conversation partner's IP telephone terminal 121, and the like.

The router 101 changes the sender IP address of the ACK message received from the conversation partner's IP telephone terminal 121 to the local IP address (192.168.0.1) of the router 101, and changes the destination IP address of the ACK message to the local IP address (192.168.0.2) of the proxy 103 by referring to the NAT table 102 (at a step S223). The router 101 then transfers the ACK message to the proxy 103 (at a step S225).

The proxy 103 determines that the ACK message should be transferred to the call control server 105 by viewing the sender's telephone number included in the ACK message received at the step S225, changes the sender IP address of the ACK message to the local IP address (192.168.0.2) of the proxy 103, and changes the destination IP address of the ACK message to the local IP address (192.168.0.3) of the call control server 105 (at a step S227). The proxy 103 then transfers the ACK message to the call control server 105 (at a step S229). It is noted that the proxy 103 knows the local IP address of the call control server 105 from the beginning similarly to those of the first IP telephone terminal 107-1 and the second IP telephone terminal 107-2.

The call control server 105 recognizes that the ACK message is in response to the OGM from the first IP telephone terminal 107-1 by referring to the conversation identification information included in the ACK message received from the proxy 103. The call control server 105 determines a protocol and a parameter used for the telephone conversation, a receive port number of the first IP telephone terminal 107-1, a receive port number of the conversation partner's IP telephone terminal 121, and the like based on contents of both the OGM and ACK messages (at a step S231). Before the call control server 105 determines these communication conditions, the call control server 105 may keep having communications with the first IP telephone terminal 107-1 and the conversation partner's IP telephone terminal 121.

The call control server 105 notifies the first IP telephone terminal 107-1 of the protocol, the parameter, the local IP address of the proxy 103, and the receive port number of the conversation partner's IP telephone terminal 121 thus determined (at a step S233).

The call control server 105 notifies the conversation partner's IP telephone terminal 121 of the protocol, the parameter, the global IP address of the router 101, and the receive port number of the first IP telephone terminal 107-1 thus determined (at a step S235).

Upon completion of the signaling described above, the telephone conversation between the first IP telephone terminal 107-1 and the conversation partner's IP telephone terminal 121 starts.

2-2. Telephone Conversation

The telephone conversation takes place not through the call control server 105 but through the router 101 and the proxy 103.

Figure 8:
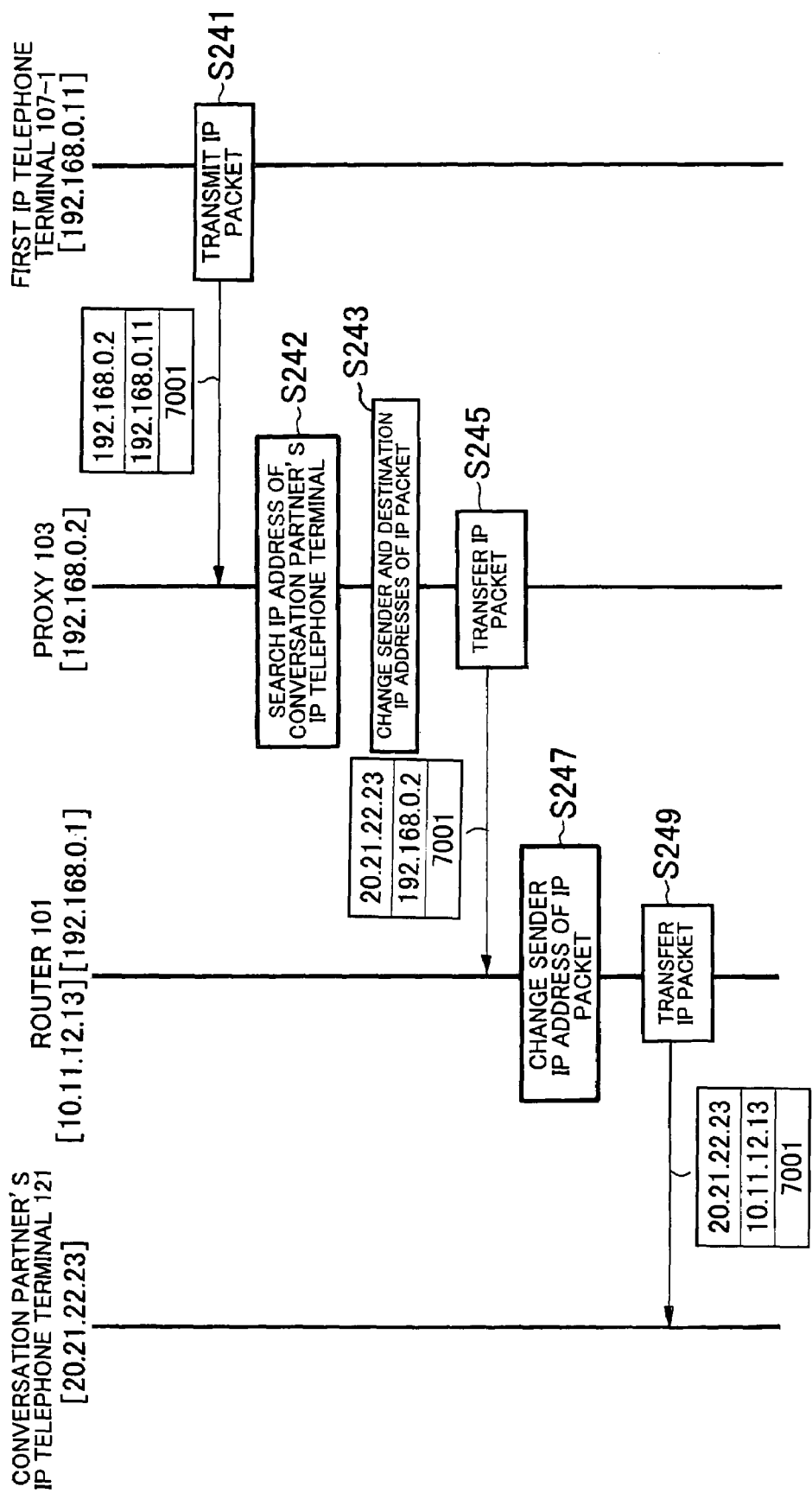
FIG. 8 is a first sequence chart that depicts an operation performed by the IP telephony system during a telephone conversation according to the embodiment of the present invention.

FIG. 8 depicts an IP packet transmitted from the first IP telephone terminal 107-1 to the conversation partner's IP telephone terminal 121.

Referring to FIG. 8, the first IP telephone terminal 107-1 transmits an IP packet including a voice packet such as an RTP packet to the proxy 103 (at a step S241). A sender IP address of this IP packet is the IP address (192.168.0.11) of the first IP telephone terminal 107-1, a destination IP address thereof is the IP address (192.168.0.2) of the proxy 103, and a port number thereof is a receive port number (7001) of the conversation partner's IP telephone terminal 121.

The proxy 103 searches the IP address (20.21.22.23) of the conversation partner's IP telephone terminal 121 corresponding to the port number (7001) of the IP packet received at the step S241, from the proxy table 104. In addition, the proxy 103 may reconfirm that the IP address (20.21.22.23) of the conversation partner's IP telephone terminal 121 corresponds to the port number (7001) of the IP packet by determining whether the IP address (20.21.22.23) is included in one or a plurality of IP addresses searched from the proxy table 104 as the IP address corresponding to the sender IP address (192.168.0.11) of the IP packet received at the step S241 (the local IP address of the first IP telephone terminal 107-1) (at a step S242).

The proxy 103 changes the sender IP address of the received IP packet to the local IP address (192.168.0.2) of the proxy 103, and changes the destination IP address thereof to the IP address (20.21.22.23) of the conversation partner's IP telephone terminal 121 searched at the step S242 (at a step S243). The proxy 103 then transfers the IP packet, the sender IP address and the destination IP address of which are thus changed, to the router 101 (at a step S245).

The router 101 searches the global IP address (10.11.12.13) of the router 101 corresponding to the sender IP address (192.168.0.2) of the received IP packet from the NAT table 102, and changes the sender IP address of the received IP packet to the searched global IP packet (10.11.12.13) of the router 101 (at a step S247). The router 101 then transmits the IP packet, the sender IP address of which is thus changed, to the conversation partner's IP telephone terminal 121 (at a step S249).

Figure 9:
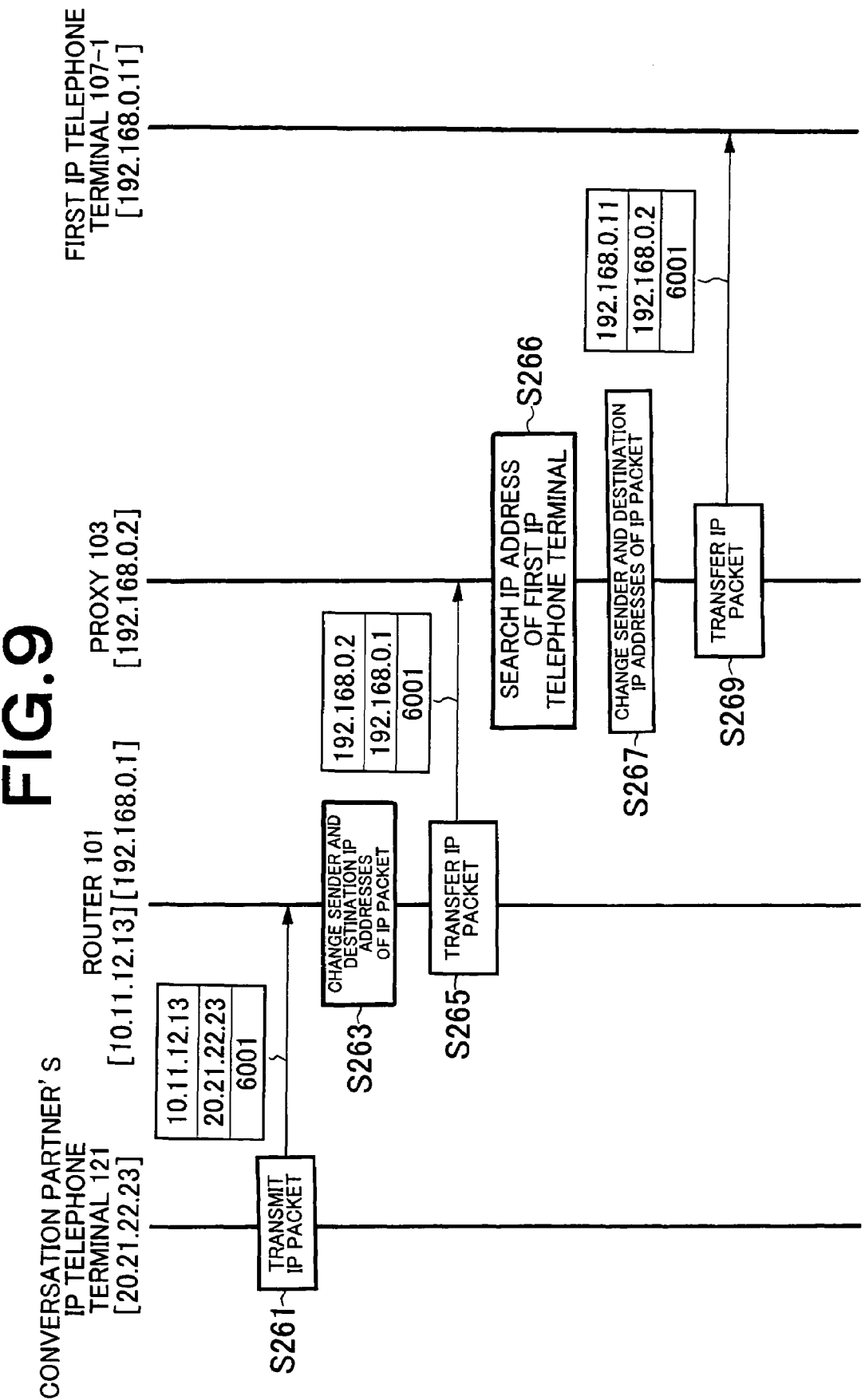
FIG. 9 is a second sequence chart that depicts an operation performed by the IP telephony system during a telephone conversation according to the embodiment of the present invention.

FIG. 9 depicts a packet transmitted from the conversation partner's IP telephone terminal 121 to the first IP telephone terminal 107-1.

Referring to FIG. 9, the conversation partner's IP telephone terminal 121 transmits an IP packet including a voice packet such as an RTP packet to the router 101 (at a step S261). A sender IP address of this packet is the global IP address (20.21.22.23) of the conversation partner's IP telephone terminal 121, a destination IP address thereof is the global IP address (10.11.12.13) of the router 101, and a port number thereof is a receive port number (6001) of the first IP telephone terminal 107-1.

The router 101 searches, from the NAT table 102, the local IP address (192.168.0.2) of the proxy 103 corresponding to the global IP address (10.11.12.13) of the router 101 described as the destination IP address of the IP packet received at the step S261, and changes the destination IP address of the IP packet received at the step S261 to the searched local IP address (192.168.0.2) of the proxy 103 (at a step S263). The sender IP address of this IP packet remains the global IP address (20.21.22.23) of the conversation partner's IP telephone terminal 121.

The router 101 transmits the IP packet, the sender IP address and the destination IP address of which are changed at the step S263, to the proxy 103 (at a step S265).

The proxy 103 searches the local IP address (192.168.0.11) of the first IP telephone terminal 107-1 corresponding to the port number (6001) of the IP packet received at the step S265 (the global IP address of the conversation partner's IP telephone terminal 121) from the proxy table 104 (at a step S266).

The proxy 103 changes the sender IP address of the IP packet received at the step S265 to the local IP address (192.168.0.2) of the proxy 103, changes the destination IP address thereof to the local IP address (192.168.0.11) of the first IP telephone terminal 107-1 searched at the step S266(at a step S267), and transmits the IP packet, the sender IP address and the destination IP address of which are thus changed, to the first IP telephone terminal 107-1 (at a step S269).

2-3-1. Transfer (1)

Figure 10:
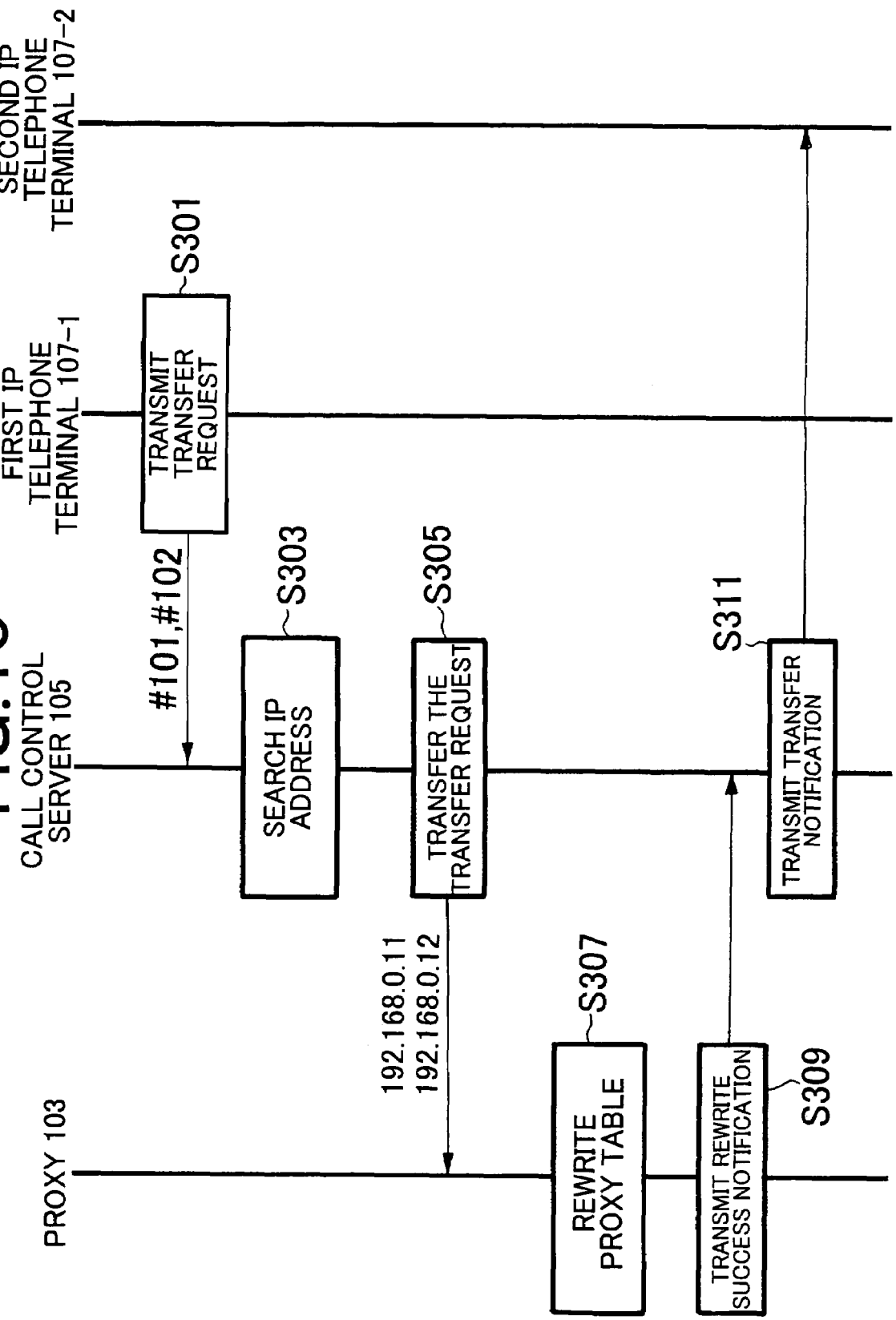
FIG. 10 is a sequence chart that depicts an operation performed by the IP telephony system during transfer based on one transfer method according to the embodiment of the present invention.

A first method for transferring an IP packet from the first IP telephone terminal 107-1 to the second IP telephone terminal 107-2 will be described with reference to FIG. 10.

The first IP telephone terminal 107-1 transmits a transfer request to the call control server 105 (at a step S301). The transfer request includes the extension number #101 of the first IP telephone terminal 107-1 and the extension number #102 of the second IP telephone terminal 107-2.

The call control server 105 searches the local IP address (192.168.0.11) of the first IP telephone terminal 107-1 corresponding to the extension number #101 of the first IP telephone terminal 107-1 and the local IP address (192.168.0.12) of the second IP telephone terminal 107-2 corresponding to the extension number #102 of the second IP telephone terminal 107-2, from the call control table 106 (at a step S303).

The call control server 105 transfers the transfer request to the proxy 103 (at a step S305). This transfer request includes the local IP address (192.168.0.11) of the first IP telephone terminal 107-1 and the local IP address (192.168.0.12) of the second IP telephone terminal 107-2.

The proxy 103 searches a record including the local IP address (192.168.0.11) of the first IP telephone terminal 107-1 from the proxy table 104, and rewrites the local IP address (192.168.0.11) of the first IP telephone terminal 107-1 in the record to the local IP address (192.168.0.12) of the second IP telephone terminal 107-2 (at a step S307).

The proxy 103 transmits a rewrite success notification to the call control server 105 (at a step S309), and the call control server 105 transmits a transfer notification to the second IP telephone terminal 107-2 (at a step S311).

2-3-2. Transfer (2)

Figure 11:
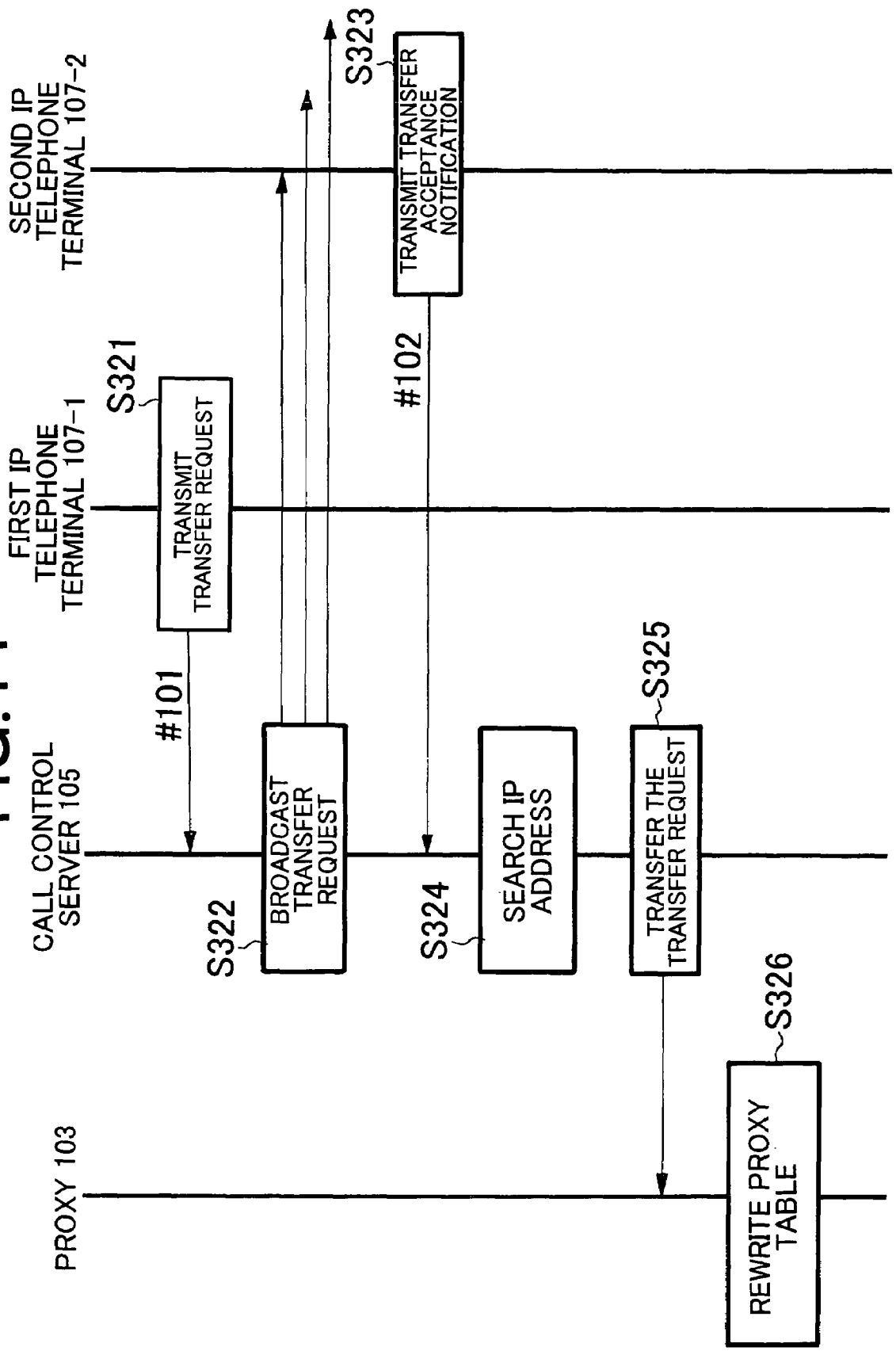
FIG. 11 is a sequence chart that depicts an operation performed by the IP telephony system during transfer based on another transfer method according to the embodiment of the present invention.

A second method for transferring an IP packet from the first IP telephone terminal 107-1 to the second IP telephone terminal 107-2 will be described with reference to FIG. 11.

The first IP telephone terminal 107-1 transmits a transfer request to the call control server 105 (at a step S321). The transfer request includes the extension number #101 of the first IP telephone terminal 107-1.

The call control server 105 broadcasts the transfer request to the second IP telephone terminal 107-2 and the other IP telephone terminals connected to the LAN 111 (at a step S322).

The second IP telephone terminal 107-2 transmits a transfer acceptance notification to the call control server 105 (at a step S323). The transfer acceptance notification includes the extension number #102 of the second IP telephone terminal 107-2.

The call control server 105 searches the local IP address (192.168.0.11) of the first IP telephone terminal 107-1 corresponding to the extension number #101 of the first IP telephone terminal 107-1 and the local IP address (192.168.0.12) of the second IP telephone terminal 107-2 corresponding to the extension number #102 of the second IP telephone terminal 107-2 from the call control table 106 (at a step S324).

The call control server 105 transfers the transfer request to the proxy 103 (at a step S325). This transfer request includes the local IP address (192.168.0.11) of the first IP telephone terminal 107-1 and the local IP address (192.168.0.12) of the second IP telephone terminal 107-2.

The proxy 103 searches a record including the local IP address (192.168.0.11) of the first IP telephone terminal 107-1 from the proxy table 104, and rewrites the local IP address (192.168.0.11) of the first IP telephone terminal 107-1 in the record to the local IP address (192.168.0.12) of the second IP telephone terminal 107-2 (at a step S326).

The transfer request transmitted at the step S321 may not necessarily include the extension number #101 of the first IP telephone terminal 107-1. Even if the transfer request does not include the extension number #101 of the first IP telephone terminal 107-1, the call control server 105 can identify the first IP telephone terminal 107-1 from the sender IP address, i.e., the local IP address (192.168.0.11) of the first IP telephone terminal 107-1 as long as the transfer request is transmitted while being carried on the IP packet. Likewise, the transfer acceptance request transmitted at the step S323 may not necessarily include the extension number #102 of the second IP telephone terminal 107-2. Even if the transfer acceptance request does not include the extension number #102 of the second IP telephone terminal 107-2, the call control server 105 can identify the second IP telephone terminal 107-2 from the sender IP address, i.e., the local IP address (192.168.0.12) of the second IP telephone terminal 107-2 as long as the transfer acceptance request is transmitted while being carried on the IP packet. In these cases, the step S324 can be omitted.

2-4. Relay of Telephone Conversation Between IP Telephone Terminals Outside LAN

In the above-stated embodiment, after the telephone conversation starts, the sender IP address of the IP packet transferred at the step S245 is the local IP address (192.168.0.2) of the proxy 103 and the destination IP address thereof is the global IP address (20.21.22.23) of the conversation partner's IP telephone terminal 121 on the transmitting end.

Further, in the embodiment, after the telephone conversation starts, the following operations are performed on the receiving end. The proxy 103 searches the local IP address (192.168.0.11) of the first IP telephone terminal 107-1 corresponding to the port number (6001) of the IP packet received at the step S265 (the global IP address of the conversation partner's IP telephone terminal 121), from the proxy table 104 (at the step S266). In addition, the proxy 103 changes the sender IP address of the IP packet received at the step S265 to the local IP address (192.168.0.11) of the proxy 103, changes the destination IP address thereof to the local IP address (192.168.0.11) of the first IP telephone terminal 107-1 searched at the step S266 (at the step S267), and transmits the IP packet, the sender IP address and the destination IP address of which are thus changed, to the first IP telephone terminal 107-1 (at the step S269). The sender IP address of this IP packet is the local IP address (192.168.0.2) of the proxy 103 and the destination IP address thereof is the local IP address (192.168.0.11) of the first IP telephone terminal 107-1.

If the IP packet transmitted at the step S245 is compared with the IP packet transmitted at the step S268, the sender IP address is common to the both IP packets but the destination IP address is different. The destination IP addresses of the respective IP packets are described in the proxy table 104.

Figure 12:
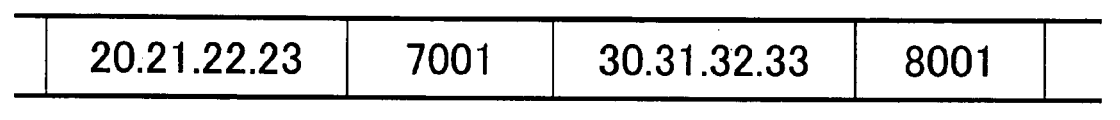

As shown in FIG. 12, therefore, if the local IP address (192.168.0.11) of the IP telephone inside the LAN 111 described in the proxy table 104 is rewritten to, for example, a global IP address (30.31.32.33) of a second conversation partner's IP telephone terminal having the telephone number #202 so that the global IP address (20.21.22.23) of the conversation partner's IP telephone terminal 121 can be made to correspond to the global IP address (30.31.32.33) of the second conversation partner's IP telephone terminal, it is possible to execute the step S243 after the step S266. If so, the packet transmitted from the conversation partner's IP telephone terminal 121 can be transmitted to the second conversation partner's IP telephone terminal. In other words, the proxy can relay a telephone conversation between the two IP telephone terminals outside the LAN.

What is claimed is:

1. An IP telephony method for causing a telephone conversation to take place between a caller's IP telephone terminal and a conversation partner's IP telephone terminal through a proxy and a router using an IP packet including a voice packet, the method comprising:
  a first record generation step of generating a first record that represents a correspondence between a local IP address of a caller's first IP telephone terminal and a global IP address of the conversation partner's IP telephone terminal;
  a step of causing the proxy to receive the IP packet transmitted from the caller's first IP telephone terminal;
  a step of causing the proxy to change a destination IP address of the IP packet to the global IP address of the conversation partner's IP telephone terminal by referring to the local IP address of the caller's first IP telephone terminal and the first record;
  a first transfer step of causing the proxy to transfer the IP packet, the destination address of which is changed, to the router; and
  a second transfer step of causing the router to transfer the IP packet, which is received from the proxy, to the conversation partner's IP telephone terminal.

2. The IP telephony method according to claim 1, further comprising:
  a step of generating a second record that represents a correspondence between a global IP address of the router and a local IP address of the proxy; and
  a step of causing the router to change a sender IP address of the IP packet, which is received from the proxy, to the global IP address of the router before the second transfer step by referring to the local IP address of the proxy and the second record.

3. The IP telephony method according to claim 1, further comprising, before the first record generation step:
  a step of preparing a first table that holds a correspondence between a telephone number of an IP telephone terminal outside a LAN and a global IP address of the IP telephone terminal outside the LAN;
  an outgoing message reception step of causing the proxy to receive an outgoing message in which a telephone number of the conversation partner's IP telephone terminal and the local IP address of the caller's first IP telephone terminal are described; and
  a step of causing the proxy to acquire the global IP address of the conversation partner's IP telephone terminal corresponding to the telephone number described in the outgoing message which is received, from the table, wherein
  at the first record generation step, the first record is generated using the local IP address of the caller's first IP telephone terminal received by the proxy and the global IP address of the conversation partner's IP telephone terminal acquired by the proxy.

4. The IP telephony method according to claim 3, further comprising, before the outgoing message reception step:
  a step of preparing a second table that holds a correspondence between the telephone number of the IP telephone terminal outside the LAN and a local IP address of the proxy;
  a step of causing the caller's first IP telephone terminal to transmit the outgoing message, in which the telephone number of the conversation partner's IP telephone terminal is described, to a call control server;
  a step of causing the call control server to search the local IP address of the proxy corresponding to the telephone number described in the outgoing message received from the caller's first IP telephone terminal, from the second table; and
  an outgoing message transfer step of causing the call control server to transfer the outgoing message to the proxy while setting the local IP address of the proxy searched from the second table as the destination IP address of the IP packet, wherein
  the outgoing message reception step is executed to correspond to the outgoing message transfer step.

5. The IP telephony method according to claim 1, further comprising:
  a first record rewrite step of rewriting the local IP address of the caller's first IP telephone terminal in the first record to a local IP address of a caller's second IP telephone terminal;
  a step of causing the proxy to receive the IP packet transmitted from the caller's second IP telephone terminal;
  a step of causing the proxy to change the destination IP address of the IP packet to the global IP address of the conversation partner's IP telephone terminal by referring to the local IP address of the caller's second IP telephone terminal and the first record in which the local IP address of the caller's first IP telephone terminal is rewritten to the local IP address of the caller's second IP telephone terminal;
  a third transfer step of causing the proxy to transfer the IP packet, the destination address of which is changed, to the router; and
  a fourth transfer step of causing the router to transfer the IP packet, which is received from the proxy, to the conversation partner's IP telephone terminal.

6. The IP telephony method according to claim 5, further comprising, before the first record rewrite step:

a transfer indication message transmission step of causing a call control server to transmit a transfer indication message accompanied by the local IP address of the caller's first IP telephone terminal and the local IP address of the caller's second IP telephone terminal, to the proxy, wherein the first record rewrite step is executed based on the local IP address of the caller's first IP telephone terminal and the local IP address of the caller's second IP telephone terminal transmitted at the transfer indication message transmission step.

7. The IP telephony method according to claim 6, further comprising, before the transfer indication message transmission step:

a caller's first IP telephone terminal local IP address detection step of detecting the local IP address of the caller's first IP telephone terminal; and a caller's second IP telephone terminal local IP address detection step of detecting the local IP address of the caller's second IP telephone terminal.

8. The IP telephony method according to claim 7, further comprising, before the caller's first IP telephone terminal local IP address detection step:

a step of preparing a third table that represents a correspondence between a telephone number of the each caller's IP telephone terminal and the local IP address of the each caller's IP telephone terminal; and a step of detecting the telephone number of the caller's first IP telephone terminal, wherein the caller's first IP telephone terminal local IP address detection step is executed based on the detected telephone number of the caller's first IP telephone terminal and the third table.

9. The IP telephony method according to claim 7, further comprising, before the caller's second IP telephone terminal local IP address detection step:

a step of preparing a third table that represents a correspondence between a telephone number of the each caller's IP telephone terminal and the local IP address of the each caller's IP telephone terminal; and a step of detecting the telephone number of the caller's second IP telephone terminal, wherein the caller's second IP telephone terminal local IP address detection step is executed based on the detected telephone number of the caller's second IP telephone terminal and the third table.

10. An IP telephony method for causing a telephone conversation to take place between a caller's IP telephone terminal and a conversation partner's IP telephone terminal through a proxy and a router using an IP packet including a voice packet, the method comprising:

a first record generation step of generating a first record that represents a correspondence among a local IP address of a caller's first IP telephone terminal, a receive port of the caller's first IP telephone terminal, a global IP address of the conversation partner's IP telephone terminal, and a receive port of the conversation partner's IP telephone terminal;

a first transfer step of causing the router to transfer the IP packet, which is transmitted from the conversation partner's IP telephone terminal, to the proxy;

a step of causing the proxy to change a destination IP address of the IP packet to the local IP address of the caller's first IP telephone terminal by referring to a port number of the IP packet received from the router and the first record;

a second transfer step of causing the proxy to transfer the IP packet, the destination IP address of which is changed, to the caller's first IP telephone terminal; and a step of generating a second record that represents a correspondence between a global IP address of the router and a local IP address of the proxy; and a step of causing the router to change a destination IP address of the IP packet, which is received from the conversation partner's IP telephone terminal, to the local IP address of the proxy before the first transfer step by referring to the global IP address of the router and the second record.

11. The IP telephony method according to claim 10, further comprising, before the first record generation step:

a step of preparing a first table that holds a correspondence between a telephone number of an IP telephone terminal outside a LAN and a global IP address of the IP telephone terminal outside the LAN;

an outgoing message reception step of causing the proxy to receive an outgoing message in which a telephone number of the conversation partner's IP telephone terminal and the local IP address of the caller's first IP telephone terminal are described; and a step of causing the proxy to acquire the global IP address of the conversation partner's IP telephone terminal corresponding to the telephone number described in the outgoing message which is received, from the table, wherein at the first record generation step, the first record is generated using the local IP address of the caller's first IP telephone terminal received by the proxy and the global IP address of the conversation partner's IP telephone terminal acquired by the proxy.

12. The IP telephony method according to claim 11, further comprising, before the outgoing message reception step:

a step of preparing a second table that holds a correspondence between the telephone number of the IP telephone terminal outside the LAN and a local IP address of the proxy;

a step of causing the caller's first IP telephone terminal to transmit the outgoing message, in which the telephone number of the conversation partner's IP telephone terminal is described, to a call control server;

a step of causing the call control server to search the local IP address of the proxy corresponding to the telephone number described in the outgoing message received from the caller's first IP telephone terminal, from the second table; and an outgoing message transfer step of causing the call control server to transfer the outgoing message to the proxy while setting the local IP address of the proxy searched from the second table as the destination IP address of the IP packet, wherein the outgoing message reception step is executed to correspond to the outgoing message transfer step.

13. The IP telephony method according to claim 10, further comprising:

a first record rewrite step of rewriting the local IP address of the caller's first IP telephone terminal in the first record to a local IP address of a caller's second IP telephone terminal;

the first transfer step of causing the router to transfer the IP packet, which is transmitted from the conversation partner's IP telephone terminal, to the proxy;

a step of causing the proxy to change the destination IP address of the IP packet, which is received from the router, to the local IP address of the caller's second IP telephone terminal by referring to a port number of the IP packet received from the router and the first record; and the second transfer step of causing the proxy to transfer the IP packet, the destination IP address of which is changed, to the caller's second IP telephone terminal.

14. The IP telephony method according to claim 13, further comprising, before the first record rewrite step:
a transfer indication message transmission step of causing a call control server to transmit a transfer indication message accompanied by the local IP address of the caller's first IP telephone terminal and the local IP address of the caller's second IP telephone terminal, to the proxy, wherein
the first record rewrite step is executed based on the local IP address of the caller's first IP telephone terminal and the local IP address of the caller's second IP telephone terminal transmitted at the transfer indication message transmission step.

15. The IP telephony method according to claim 14, further comprising, before the transfer indication message transmission step:
a caller's first IP telephone terminal local IP address detection step of detecting the local IP address of the caller's first IP telephone terminal; and
a caller's second IP telephone terminal local IP address detection step of detecting the local IP address of the caller's second IP telephone terminal.

16. The IP telephony method according to claim 15, further comprising, before the caller's first IP telephone terminal local IP address detection step:
a step of preparing a third table that represents a correspondence between a telephone number of the each caller's IP telephone terminal and the local IP address of the each caller's IP telephone terminal; and
a step of detecting the telephone number of the caller's first IP telephone terminal, wherein
the caller's first IP telephone terminal local IP address detection step is executed based on the detected telephone number of the caller's first IP telephone terminal and the third table.

17. The IP telephony method according to claim 15, further comprising, before the caller's second IP telephone terminal local IP address detection step:
a step of preparing a third table that represents a correspondence between a telephone number of the each caller's IP telephone terminal and the local IP address of the each caller's IP telephone terminal; and
a step of detecting the telephone number of the caller's second IP telephone terminal, wherein
the caller's second IP telephone terminal local IP address detection step is executed based on the detected telephone number of the caller's second IP telephone terminal and the third table.

18. An IP telephony method for causing a telephone conversation to take place between a first IP telephone terminal outside a LAN and a second IP telephone terminal outside the LAN through a proxy and a router using an IP packet including a voice packet, the method comprising:
a first record generation step of generating a first record that represents a correspondence among a global IP address of the first IP telephone terminal outside the LAN, a receive port of the first IP telephone terminal outside the LAN, a global IP address of the second IP telephone terminal outside the LAN, and a receive port of the second IP telephone terminal outside the LAN;

a first transfer step of causing the router to transfer the IP packet, which is transmitted from the first IP telephone terminal outside the LAN, to the proxy;
a step of causing the proxy to change a destination IP address of the IP packet to the global IP address of the second IP telephone terminal outside the LAN by referring to a port number of the IP packet received from the router and the first record;
the first transfer step of causing the proxy to transfer the IP packet, the destination IP address of which is changed, to the router; and
a second transfer step of causing the router to transfer the IP packet, which is received from the proxy, to the second IP telephone terminal outside the LAN.

19. An IP telephony system for causing a telephone conversation to take place between a caller's IP telephone terminal and a conversation partner's IP telephone terminal through a proxy and a router using an IP packet including a voice packet, the system comprising:
first record generation means for generating a first record that represents a correspondence between a local IP address of a caller's first IP telephone terminal and a global IP address of the conversation partner's IP telephone terminal;
means for causing the proxy to receive the IP packet transmitted from the caller' first IP telephone terminal;
means for causing the proxy to change a destination IP address of the IP packet to the global IP address of the conversation partner's IP telephone terminal by referring to the local IP address of the caller's first IP telephone terminal and the first record;
first transfer means for causing the proxy to transfer the IP packet, the destination address of which is changed, to the router; and
second transfer means for causing the router to transfer the IP packet, which is received from the proxy, to the conversation partner's IP telephone terminal.

20. The IP telephony system according to claim 19, further comprising:
means for generating a second record that represents a correspondence between a global IP address of the router and a local IP address of the proxy; and
means for causing the router to change a sender IP address of the IP packet, which is received from the proxy, to the global IP address of the router before the second transfer means operates by referring to the local IP address of the proxy and the second record.

21. The IP telephony system according to claim 19, further comprising:
means for preparing a first table that holds a correspondence between a telephone number of an IP telephone terminal outside a LAN and a global IP address of the IP telephone terminal outside the LAN;
outgoing message reception means for causing the proxy to receive an outgoing message in which a telephone number of the conversation partner's IP telephone terminal and the local IP address of the caller's first IP telephone terminal are described; and
means for causing the proxy to acquire the global IP address of the conversation partner's IP telephone terminal corresponding to the telephone number described in the outgoing message which is received, from the table, wherein
in the first record generation means, the first record is generated using the local IP address of the caller's first IP telephone terminal received by the proxy and the global IP address of the conversation partner's IP telephone terminal acquired by the proxy.

22. The IP telephony system according to claim 21, further comprising:
means for preparing a second table that holds a correspondence between the telephone number of the IP telephone terminal outside the LAN and a local IP address of the proxy;
means for causing the caller's first IP telephone terminal to transmit the outgoing message, in which the telephone number of the conversation partner's IP telephone terminal is described, to a call control server;
means for causing the call control server to search the local IP address of the proxy corresponding to the telephone number described in the outgoing message received from the caller's first IP telephone terminal, from the second table; and
outgoing message transfer means for causing the call control server to transfer the outgoing message to the proxy while setting the local IP address of the proxy searched from the second table as the destination IP address of the IP packet, wherein
the outgoing message reception means is operated to correspond to the outgoing message transfer means.

23. The IP telephony system according to claim 19, further comprising:
first record rewrite means for rewriting the local IP address of the caller's first IP telephone terminal in the first record to a local IP address of a caller's second IP telephone terminal;
means for causing the proxy to receive the IP packet transmitted from the caller's second IP telephone terminal;
means for causing the proxy to change the destination IP address of the IP packet to the global IP address of the conversation partner's IP telephone terminal by referring to the local IP address of the caller's second IP telephone terminal and the first record in which the local IP address of the caller's first IP telephone terminal is rewritten to the local IP address of the caller's second IP telephone terminal;
third transfer means for causing the proxy to transfer the IP packet, the destination address of which is changed, to the router; and
fourth transfer means for causing the router to transfer the IP packet, which is received from the proxy, to the conversation partner's IP telephone terminal.

24. The IP telephony system according to claim 23 further comprising:
transfer indication message transmission means for causing a call control server to transmit a transfer indication message accompanied by the local IP address of the caller's first IP telephone terminal and the local IP address of the caller's second IP telephone terminal, to the proxy, wherein
the first record rewrite means is operated based on the local IP address of the caller's first IP telephone terminal and the local IP address of the caller's second IP telephone terminal transmitted in the transfer indication message transmission means.

25. The IP telephony system according to claim 24, further comprising:
caller's first IP telephone terminal local IP address detection means for detecting the local IP address of the caller's first IP telephone terminal; and
caller's second IP telephone terminal local IP address detection means for detecting the local IP address of the caller's second IP telephone terminal.

26. The IP telephony system according to claim 25, further comprising:
means for preparing a third table that represents a correspondence between a telephone number of the each caller's IP telephone terminal and the local IP address of the each caller's IP telephone terminal; and
means for detecting the telephone number of the caller's first IP telephone terminal, wherein
the caller's first IP telephone terminal local IP address detection means is operated based on the detected telephone number of the caller's first IP telephone terminal and the third table.

27. The IP telephony system according to claim 25, further comprising:
means for preparing a third table that represents a correspondence between a telephone number of the each caller's IP telephone terminal and the local IP address of the each caller's IP telephone terminal; and
means for detecting the telephone number of the caller's second IP telephone terminal, wherein
the caller's second IP telephone terminal local IP address detection means is operated based on the detected telephone number of the caller's second IP telephone terminal and the third table.

28. An IP telephony system for causing a telephone conversation to take place between a caller's IP telephone terminal and a conversation partner's IP telephone terminal through a proxy and a router using an IP packet including a voice packet, the system comprising:
first record generation means for generating a first record that represents a correspondence among a local IP address of a caller's first IP telephone terminal, a receive port of the caller's first IP telephone terminal, a global IP address of the conversation partner's IP telephone terminal, and a receive port of the conversation partner's IP telephone terminal;
first transfer means for causing the router to transfer the IP packet, which is transmitted from the conversation partner's IP telephone terminal, to the proxy;
means for causing the proxy to change a destination IP address of the IP packet to the local IP address of the caller's first IP telephone terminal by referring to a port number of the IP packet received from the router and the first record;
second transfer means for causing the proxy to transfer the IP packet, the destination IP address of which is changed, to the caller's first IP telephone terminal; and
means for generating a second record that represents a correspondence between a global IP address of the router and a local IP address of the proxy; and
means for causing the router to change a destination IP address of the IP packet, which is received from the conversation partner's IP telephone terminal, to the local IP address of the proxy before the first transfer means operates by referring to the global IP address of the router and the second record.

29. The IP telephony system according to claim 28, further comprising:
means for preparing a first table that holds a correspondence between a telephone number of an IP telephone terminal outside a LAN and a global IP address of the IP telephone terminal outside the LAN;
outgoing message reception means for causing the proxy to receive an outgoing message in which a telephone number of the conversation partner's IP telephone terminal and the local IP address of the caller's first IP telephone terminal are described; and means for causing the proxy to acquire the global IP address of the conversation partner's IP telephone terminal corresponding to the telephone number described in the outgoing message which is received, from the table, wherein the first record generation means, the first record is generated using the local IP address of the caller's first IP telephone terminal received by the proxy and the global IP address of the conversation partner's IP telephone terminal acquired by the proxy.

30. The IP telephony system according to claim 29, further comprising:

means for preparing a second table that holds a correspondence between the telephone number of the IP telephone terminal outside the LAN and a local IP address of the proxy;

means for causing the caller's first IP telephone terminal to transmit the outgoing message, in which the telephone number of the conversation partner's IP telephone terminal is described, to a call control server;

means for causing the call control server to search the local IP address of the proxy corresponding to the telephone number described in the outgoing message received from the caller's first IP telephone terminal, from the second table; and outgoing message transfer means for causing the call control server to transfer the outgoing message to the proxy while setting the local IP address of the proxy searched from the second table as the destination IP address of the IP packet, wherein the outgoing message reception means is operated to correspond to the outgoing message transfer means.

31. The IP telephony system according to claim 28, further comprising:

first record rewrite means for rewriting the local IP address of the caller's first IP telephone terminal in the first record to a local IP address of a caller's second IP telephone terminal;

the first transfer means for causing the router to transfer the IP packet, which is transmitted from the conversation partner's IP telephone terminal, to the proxy;

means for causing the proxy to change the destination IP address of the IP packet, which is received from the router, to the local IP address of the caller's second IP telephone terminal by referring to a port number of the IP packet received from the router and the first record; and the second transfer means for causing the proxy to transfer the IP packet, the destination IP address of which is changed, to the caller's second IP telephone terminal.

32. The IP telephony system according to claim 31, further comprising:

transfer indication message transmission means for causing a call control server to transmit a transfer indication message accompanied by the local IP address of the caller's first IP telephone terminal and the local IP address of the caller's second IP telephone terminal, to the proxy, wherein the first record rewrite means is operated based on the local IP address of the caller's first IP telephone terminal and the local IP address of the caller's second IP telephone terminal transmitted in the transfer indication message transmission means.

33. The IP telephony system according to claim 32, further comprising:

caller's first IP telephone terminal local IP address detection means for detecting the local IP address of the caller's first IP telephone terminal; and caller's second IP telephone terminal local IP address detection means for detecting the local IP address of the caller's second IP telephone terminal.

34. The IP telephony system according to claim 33, further comprising:

means for preparing a third table that represents a correspondence between a telephone number of the each caller's IP telephone terminal and the local IP address of the each caller's IP telephone terminal; and means for detecting the telephone number of the caller's first IP telephone terminal, wherein the caller's first IP telephone terminal local IP address detection means is operated based on the detected telephone number of the caller's first IP telephone terminal and the third table.

35. The IP telephony system according to claim 33, further comprising:

means for preparing a third table that represents a correspondence between a telephone number of the each caller's IP telephone terminal and the local IP address of the each caller's IP telephone terminal; and means for detecting the telephone number of the caller's second IP telephone terminal, wherein the caller's second IP telephone terminal local IP address detection means is operated based on the detected telephone number of the caller's second IP telephone terminal and the third table.

36. An IP telephony system for causing a telephone conversation to take place between a first IP telephone terminal outside a LAN and a second IP telephone terminal outside the LAN through a proxy and a router using an IP packet including a voice packet, the system comprising:

first record generation means for generating a first record that represents a correspondence among a global IP address of the first IP telephone terminal outside the LAN, a receive port of the first IP telephone terminal outside the LAN, a global IP address of the second IP telephone terminal outside the LAN, and a receive port of the second IP telephone terminal outside the LAN;

first transfer means for causing the router to transfer the IP packet, which is transmitted from the first IP telephone terminal outside the LAN, to the proxy;

means for causing the proxy to change a destination IP address of the IP packet to the global IP address of the second IP telephone terminal outside the LAN by referring to a port number of the IP packet received from the router and the first record;

the first transfer means for causing the proxy to transfer the IP packet, the destination IP address of which is changed, to the router; and second transfer means for causing the router to transfer the IP packet, which is received from the proxy, to the second IP telephone terminal outside the LAN.

* * * * *